(12) United States Patent
Liang et al.

(10) Patent No.: US 11,100,795 B2
(45) Date of Patent: Aug. 24, 2021

(54) DRIVING SERVICE ACTIVE SENSING SYSTEM AND METHOD IN INTERNET OF VEHICLES ENVIRONMENT

(71) Applicant: JIANGSU UNIVERSITY, Jiangsu (CN)

(72) Inventors: Jun Liang, Jiangsu (CN); Zhenchao Zhao, Jiangsu (CN); Long Chen, Jiangsu (CN); Haobin Jiang, Jiangsu (CN); Xiaobo Chen, Jiangsu (CN); Shidian Ma, Jiangsu (CN); Weiqi Zhou, Jiangsu (CN); Yingfeng Cai, Jiangsu (CN); Tongyang Zhao, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 16/070,976

(22) PCT Filed: Sep. 21, 2016

(86) PCT No.: PCT/CN2016/099511
§ 371 (c)(1),
(2) Date: Jul. 18, 2018

(87) PCT Pub. No.: WO2018/028025
PCT Pub. Date: Feb. 15, 2018

(65) Prior Publication Data
US 2019/0156668 A1 May 23, 2019

(30) Foreign Application Priority Data
Aug. 11, 2016 (CN) .......................... 201610658397.2

(51) Int. Cl.
*G08G 1/0967* (2006.01)
*G08G 1/01* (2006.01)
(Continued)

(52) U.S. Cl.
CPC ..... *G08G 1/096783* (2013.01); *B60W 10/184* (2013.01); *B60W 10/20* (2013.01);
(Continued)

(58) Field of Classification Search
CPC .... B60W 10/00; B60W 2300/00; G08G 1/00; H04L 1/00; H04L 2201/00; H04W 4/00
See application file for complete search history.

(56) References Cited

U.S. PATENT DOCUMENTS 8,849,306 B1 * 9/2014 McMullen .............. H04W 4/02
455/456.1
9,197,705 B2 11/2015 Lee et al.
(Continued)

FOREIGN PATENT DOCUMENTS

CN 204189211 3/2015
CN 105551252 5/2016
(Continued)

*Primary Examiner* — Hunter B Lonsberry
*Assistant Examiner* — Matthew J. Reda
(74) *Attorney, Agent, or Firm* — Hartman Global IP Law; Gary M. Hartman; Domenica N. S. Hartman

(57) ABSTRACT

A driving service active sensing system and method in an Internet of Vehicles environment in the field of road traffic safety. A sensor device and an intelligent vehicle-mounted terminal arranged on a vehicle and connected to each other. The intelligent vehicle-mounted terminal communicates with roadside equipment in 4G and DSRC modes, and communicates with a driving service information processing center in 4G mode. The roadside equipment communicates with the driving service information processing center in 4G mode. The roadside equipment is provided on both sides of a road. The sensor device outputs obtained vehicle traveling information to the intelligent vehicle-mounted terminal, which processes and integrates the received vehicle traveling information and then transfers integrated information to the roadside equipment and the driving service information
(Continued)

processing center. A driving service cloud computing platform processes the integrated information and outputs driving service information to the roadside equipment and the intelligent vehicle-mounted terminal.

11 Claims, 2 Drawing Sheets

(51) Int. Cl.
*H04W 4/02* (2018.01)
*H04L 29/14* (2006.01)
*H04W 4/44* (2018.01)
*H04L 29/08* (2006.01)
*H04W 4/38* (2018.01)
*B60W 10/184* (2012.01)
*B60W 10/20* (2006.01)
*B60W 30/18* (2012.01)
*B60W 50/14* (2020.01)
*H04W 4/80* (2018.01)

(52) U.S. Cl.
CPC ............ *B60W 30/18* (2013.01); *B60W 50/14* (2013.01); *G08G 1/012* (2013.01); *G08G 1/0112* (2013.01); *G08G 1/0129* (2013.01); *G08G 1/0141* (2013.01); *G08G 1/09675* (2013.01); *G08G 1/096716* (2013.01); *G08G 1/096725* (2013.01); *G08G 1/096741* (2013.01); *G08G 1/096775* (2013.01); *H04L 67/10* (2013.01); *H04L 67/12* (2013.01); *H04L 67/16* (2013.01); *H04L 67/26* (2013.01); *H04L 69/40* (2013.01); *H04W 4/02* (2013.01); *H04W 4/027* (2013.01); *H04W 4/38* (2018.02); *H04W 4/44* (2018.02); *B60W 2420/42* (2013.01); *B60W 2420/52* (2013.01); *B60W 2510/0638* (2013.01); *B60W 2510/1005* (2013.01); *B60W 2520/10* (2013.01); *B60W 2520/105* (2013.01); *B60W 2540/18* (2013.01); *B60W 2554/801* (2020.02); *B60W 2554/804* (2020.02); *H04W 4/80* (2018.02)

(56) References Cited

U.S. PATENT DOCUMENTS

| | | | | |
|---|---|---|---|---|
| 2002/0061741 | A1* | 5/2002 | Leung | H04L 67/18 455/414.3 |
| 2006/0046740 | A1* | 3/2006 | Johnson | H04W 4/02 455/456.1 |
| 2013/0096731 | A1* | 4/2013 | Tamari | G08G 1/0133 701/1 |
| 2013/0145482 | A1* | 6/2013 | Ricci | G06F 9/44505 726/28 |
| 2014/0005880 | A1* | 1/2014 | Guenkova-Luy | H04L 67/12 701/31.4 |
| 2014/0309812 | A1* | 10/2014 | Lee | H04L 67/12 701/2 |

FOREIGN PATENT DOCUMENTS

| | | |
|---|---|---|
| CN | 105761521 | 7/2016 |
| CN | 105844913 | 8/2016 |

* cited by examiner

DRIVING SERVICE ACTIVE SENSING SYSTEM AND METHOD IN INTERNET OF VEHICLES ENVIRONMENT

TECHNICAL FIELD

The invention relates to the field of road traffic safety, particularly, to a road traffic service perception system.

BACKGROUND

At present, the traditional driving service system mainly consists of two parts: the G-BOS terminal and the data processing center. The G-BOS terminal is installed on the vehicle and collects engine operating data, vehicle condition information and driver's control actions from the CAN bus and sensors. At the same time, the G-BOS terminal receives the information of the vehicle where the GPS satellite positioning information is recorded, all of which are transmitted by wireless Communication technology is passed to the data processing center. The data processing center analyzes and organizes the received data information through a certain operation to provide the driver with suggestions of bad driving behavior warnings, fuel consumption data, vehicle running conditions, maintenance plans and the like.

To some extent, the traditional driving service system is to provide the driver with convenience, but it has many problems. For example: 1) the traditional driving service system is aimed at a particular type of car users, buses, or trucks and other users. 2) It is precisely because of the special nature of these users, the traditional vehicle service system in the collection of vehicle information, mainly from the acquisition of vehicle engine parameters, speed, driver state of mind, focusing on the commercial vehicle economy, and provide vehicles Insufficient security protection. 3) Services which are provided by traditional driving service system lack of real-time and initiative. For example, when providing navigation services to pilots, only the level of overall congestion over a period is taken into account. Therefore, when there is an accident such as a traffic accident, the navigation back-end system cannot accurately identify in time and the path to the driver is still a path without a traffic accident. If a traffic accident occurs in this planned path, there will inevitably be further traffic congestion caused by the shortcomings of the traditional driving service and may even affect the driving safety of the vehicle.

It can be seen that the traditional driving service system has great limitations, there is an urgent need to design a wide adaptability to ensure traffic safety, real-time and the initiative of both traffic service system.

BRIEF DESCRIPTION

In view of the above-mentioned traditional service system has a small scope of application, lack of protection of traffic safety, lack of real-time traffic and service provided the shortcomings of the initiative, the present invention proposes a system and method of driving service initiative perception in the car networking environment, Which can solve the shortcomings of the traditional driving service system and provide drivers with real-time and active driving service to ensure traffic safety. In order to achieve the above object, the technical solution adopted by the active service system for driving service in a car networking environment is as follows: An active service system for driving service in a car networking environment includes an interconnected sensor device and an intelligent vehicle-mounted terminal arranged on a vehicle. It has some characteristics namely the smart car terminal communicates with the roadside equipment via 4G and DSRC and communicates with the service information center via 4G, the roadside equipment establishes communication with the driving service information processing center via 4G. The sensor device includes a camera, an OBD module, a radar sensor, a GPS differential module, a steering wheel angle sensor and a gear position information sensor. Intelligent vehicle terminal contains electronic control unit, video processing module, Bluetooth module and vehicle control module. The roadside equipment is provided on both sides of the road and includes a storage module and an ECU. Service information processing center including service cloud computing platform, traffic information state library and service directory. The sensor device outputs the acquired vehicle driving information to the intelligent vehicle-mounted terminal which processes the received vehicle driving information for the first time and then transmits the integrated information to the roadside device and traffic information processing center. The vehicle service cloud computing platform processes the integrated information and outputs the driving service information to the roadside equipment and the smart car terminal.

The technical solution adopted by the invention comprises the following steps:

A. The sensor device transmits the real-time collected information to the electronic control unit, and the electronic control unit fuses all the information.

B. The roadside equipment monitors the running of the vehicle in the area, and when detecting that the vehicle is abnormally traveling, issues warning information and generates a danger information code to be transmitted to the driving service information processing center.

C. The traffic information processing center preferentially processes the hazard information code, and the traffic information state library matches the received convergence information, and determines whether the vehicle is currently in the driving service demand state by using the service requirement state matching algorithm. If yes, the service catalog database will be matched with the fusion information with the demand status of the service vehicles, generate the service catalog by using the service catalog generation matching algorithm, and push the service catalog to the demand vehicles.

The advantages of the present invention after adopting the above technical solution lie in that:

1. The system of the present invention is more widely used. In a car networking environment, for all vehicles equipped with the system of the present invention, a driving service information processing center can provide driving service for it, and provide the owner with safety warning, path planning and other services according to the received roadside equipment, sensors to collect information on the initiative.

2. The invention focuses more on the safety of vehicles. Due to the large number of sensors in the system, it is possible to simultaneously collect the vehicle operating parameters of the service vehicle itself and the vehicle ahead of it. The system relies on the database of high-speed transmission of information and information service center of driving service in the car networking environment and a powerful back-end cloud computing platform that maximizes the driving safety of the vehicle and provides more vehicles with the guarantee of vehicle safety driving service.

3. The invention realizes that the driving service is transformed from the traditional "request-response type" into the mode of "automatic identification-active push". The serviced vehicle does not monitor the vehicle's own vehicle's operating parameters just like a conventional car service system. Through the installation of sensors and smart car terminal vehicle and with sophisticated wireless communications technology, real-time sensing devices to collect information and real-time transmission of information is achieved. The roadside equipment and service information processing center receives the traveling information extracted to judge the demand quickly and automatically for driving service to make the perception process of driving service automated, so in the event of accidents such as accidents have more time to deal with timely and automatic identification, to ensure vehicle safety and ease traffic congestion.

4. The invention generates service by itself through the service component library of the service center of the service information processing center, and finally proactively pushes the corresponding service to the user and provides effective guarantee for the service quality. The information collected by the sensor of the service vehicle extracts the characteristic information through the processing of the intelligent vehicle-mounted terminal, and determines whether there is a demand status of the service running of the current vehicle with the support of the state information database. When determining the demand of the service, the characteristic information is searching and matching with the support of the driving service catalog to finally generate the driving service catalog.

DESCRIPTION OF THE DRAWINGS

The present invention is further described in detail below with reference to the accompanying drawings and specific embodiments.

DETAILED DESCRIPTION

Figure 1:
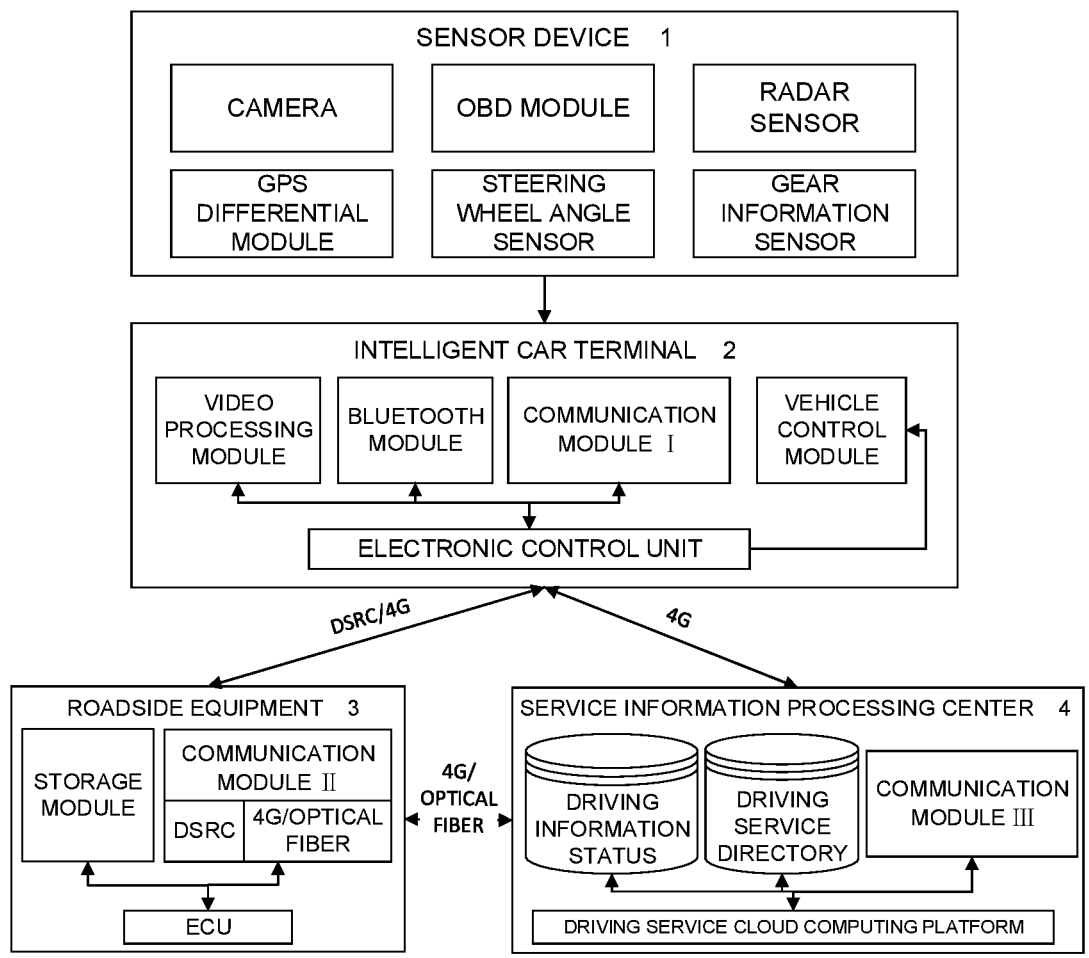
FIG. 1 shows the overall hardware connection diagram of the active service system for driving service in the car networking environment.

As shown in FIG. 1, the active service system for driving service in a car networking environment is composed of four parts of a sensor device 1, an intelligent vehicle-mounted terminal 2, a roadside equipment 3, and a driving service information processing center 4. The sensor device 1 and the intelligent vehicle-mounted terminal 2 are arranged on the vehicle, and the sensor device 1 and the intelligent vehicle-mounted terminal 2 are mounted on each vehicle to which the present system is applied. The roadside equipment 3 is arranged on the smart road network, and the background of the driving service information processing center 4 in the background contains a traffic information status database, a service catalog and a powerful cloud service platform for driving services.

In-vehicle sensor device 1 and intelligent vehicle-mounted terminal 2 get the data of vehicle operation by using CAN bus and dedicated hard-wired connection. The communication between the intelligent vehicle-mounted terminal 2 and the roadside equipment 3 uses the 4G method and the DSRC (Private Short Range Wireless Communication 802.11p) to meet the communication requirements under high-speed movement. The intelligent vehicle-mounted terminal 2 and the driving service information processing center 4 communicate directly by the 4G method or are forwarded by the roadside equipment 3 to the driving service information processing center 4. The roadside equipment 3 communicates with the driving service information processing center 4 using the 4G method.

The sensor device 1 includes a camera, an OBD module (vehicle self-diagnosis system), a radar sensor, a GPS differential module, and a steering wheel angle sensor, a gear information sensor. Camera provides video and image information of the vehicle ahead. The OBD module is used to obtain the vehicle speed $v_1$, the acceleration $a_1$, the engine speed n n, the exhaust system operating parameter and the vehicle fault code X of the host vehicle (driving active service vehicle). The radar sensor detects the speed $v_2$ and acceleration $a_2$ of the front vehicle (driving vehicle in front), the relative speed of the vehicle and the front vehicle, the distance between the host vehicle and the front vehicle, the front vehicle ID and the position of the front vehicle relative to the vehicle angle θ information in real time while the vehicle is running. The GPS differential module is used to obtain the precise geo-position information of the vehicle passing through the differentiator, such as, coordinate information of longitude, latitude and altitude. Steering wheel angle sensor is used to obtain the steering wheel angle φ. The gear information sensor is used to obtain the current gear information of the vehicle N. The vehicle running parameter information obtained by all the components in the sensor device 1 is output to the intelligent vehicle-mounted terminal 2 in real time. The OBD module communicates with the intelligent vehicle-mounted terminal 2 using a Bluetooth connection.

The intelligent vehicle-mounted terminal 2 includes an electronic control unit, a video processing module, a Bluetooth module, a communication module 1 and a vehicle control module. The communication module 1 includes a DSRC (Private Short Range Wireless Communication) communication module and a 4G communication module. The video and image information of the front vehicle obtained by the camera in the sensor device 1 is input into the video processing module and converted into digital information by the video processing module for transmission to the electronic control unit for processing. The vehicle speed $v_1$, the acceleration $a_1$, the engine speed n, the exhaust system operating parameter and the vehicle fault code X information of the host vehicle acquired by the OBD module in the sensor device 1 are transmitted to the electronic control unit in real time through the Bluetooth module in the intelligent vehicle-mounted terminal 2. The electronic control unit processes the information and transmits it to the roadside equipment 3. The radar sensor in the sensor device 1, the GPS differential module steering wheel angle sensor and the gear position information sensor are directly transmitted to the electronic control unit through the serial port respectively. The electronic control unit solves the GPS coordinate information of the longitude, latitude and altitude obtained by the GPS differential module to the xyz coordinates in the space Cartesian coordinate system, and at the same time, sends the GPS coordinates and xyz coordinates to the roadside equipment 3. The DSRC communication module in the communication module 1 is used to communicate with the roadside apparatus 3 while the vehicle is running to receive the decision instruction signal of the roadside apparatus 3. The 4G communication module is used to communicate with the driving service information processing center 4 to receive a driving service decision instruction signal of the driving service information processing center 4. The electronic control unit will firstly process the received vehicle driving information and then transmit the information to the roadside equipment 3 and the driving service information processing center 4 after the information is fused.

The output of the electronic control unit which is connected to the vehicle control module is used to execute the service decision instruction sent from the roadside equipment 3 and the driving service information processing center 4. In addition, it also prompts the vehicle or even control the vehicle brake, steering and other operations to protect the vehicle driving safety. The roadside equipment 3 includes a storage module, an ECU, and a communication module composed of a DSRC communication module and a 4G/optical fiber communication module. The ECU is respectively connected with the storage module and the communication module 2. The roadside equipment 3 is interconnected with the communication module in the intelligent vehicle-mounted terminal 2 through its communication module 2. Considering the interference of obstacles on the signal, the roadside equipment 3 tries to be installed at higher positions on both sides of the road as much as possible, and can respectively communicate with the intelligent vehicle-mounted terminal 2 and the driving service information processing center 4. In addition, it also has certain regional decision ability. The roadside equipment 3 receives the GPS coordinates, the Cartesian coordinate system coordinates (from $(x_1, y_1, z_1)$ to $(x_n, y_n, z_n)$) and the vehicle speed (from $v_1$ to $v_n$) of all the vehicles sent from the intelligent vehicle-mounted terminal 2 and real-time monitoring traffic flow, average traffic speed and traffic density of the current road segment. 1~n for this section of the vehicle number.

The road section set speed limit $v_x$ and the coordinate information stored in the storage module in the roadside equipment 3 are transmitted to the driving service information processing center 4 via the 4G/optical fiber communication mode of the communication module 2. The ECU in the roadside equipment 3 mainly monitors abnormal traffic behavior such as retrograding, overspeeding and abnormal stopping on this section and performs regional decision-making on the received information. The method for the roadside equipment 3 to specifically monitor the abnormal running of the vehicle is as follows: The ECU determines the driving lane and traveling direction of the current vehicle according to the rectangular coordinate (x, y, z) and the changing trend of the space coordinates (x, y, z) sent from the intelligent vehicle-mounted terminal 2. When the vehicle is moving normally, the coordinate is positive, on the contrary, the coordinate changes in the opposite direction. If the vehicle retrogrades, the ECU sends an alarm message to the vehicle in the segment and transmits the hazard information code to the driving service information processing center 4 via optical fiber communication. If the normal driving lane on the vehicle speed $v_n > v_x$ and duration t>4s, there are vehicles speeding. At this time, the ECU transmits warning information to the vehicle ahead in the traveling direction of the vehicle through the DSRC communication of the communication module 2, and transmits the perceived danger information code to the driving service information processing center 4 via the optical fiber and the 4G communication. Then, driving service information processing center 4 for further processing of these information. $v_n$ is the current speed of the vehicle n, $v_n$ is the speed limit set for the current road section. When the roadside equipment 3 detects the abnormal driving behavior, the warning information code is pushed to the vehicles in the area and transmitted to the communication module 1 of the intelligent vehicle-mounted terminal 2 via the DSRC communication mode of the communication module 2. After receiving the warning message code transmitted by the roadside equipment 3, the intelligent vehicle-mounted terminal 2 parses the code and displays its specific warning message on the intelligent vehicle-mounted terminal 2.

The driving service information processing center 4 includes a service cloud computing platform, a driving information status database, a service catalog, and a communication module 3. The communication module 3 is composed of a DSRC communication module and a 4G/optical fiber communication module, and communicates with the communication module 1 and the communication module 2 in the form of DSRC or 4G/optical fiber respectively. The traffic information status database stores sensor-equipped information collected by information fusion, and the electronic control unit in the sensor device 1 merges the information and transmits it to the driving service information processing center 4 and is stored in the traffic information status database. The driving service catalog stores the driving service catalog that can be directly provided by the system and links with the driving service catalog through an external code to ensure that when the driving information state library matches the demand for driving service, existing services in the service catalog can be provided quickly. The danger information code of the roadside equipment 3 and the collected information of the sensor equipment after the initial processing and information fusion in the intelligent vehicle-mounted terminal 2 are respectively input to the driving service cloud computing platform. The service cloud computing platform preferentially processes the hazard information code of the roadside equipment 3 and the vehicle fault code X in the intelligent vehicle-mounted terminal 2, and immediately triggers the driving service in the service library corresponding to these codes. The driving service information processing center 4 processes the converged information from the intelligent vehicle-mounted terminal 2 as follows: First, the fusion information is matched with the service state matching algorithm in the state information database to determine whether there is a demand for the current driving service. After determining the demand for driving service, the matching information is matched with the driving service catalog to obtain the driving service required by the current vehicle. Driving service information processing center 4 output service information is automatically sensed by the system. The service information is transmitted to the roadside equipment 3 and the intelligent vehicle-mounted terminal 2 via the communication module 3. The intelligent vehicle-mounted terminal 2 displays warning information or instructs the vehicle control module in an emergency to control the vehicle to decelerate and stop. When a traffic accident occurs on the navigation route, the driving service information processing center 4 receives the information and determines the current best driving route, and promptly warns the driver to prevent the vehicle from entering the accident-affected section.

The construction process of the driving information state library and driving service catalog is as follows: First, in order to facilitate the subsequent data processing, the overall classification of driving service according to the urgency of the service is as follows: safety service (including danger warning, control of vehicle in extremely dangerous situation), efficient service (real-time navigation, vehicle maintenance reminders, etc.), Convenience services (through a third party to achieve scheduled restaurants, hotels and other services). Second, the database structure is designed in the form of a classification tree to form three major types of driving services, vehicle traffic data collected under road traffic scenarios, three-level data service tables linked by external codes, and "people-vehicle-road-Environment" static table and dynamic table. Static tables mainly store some parameters that change infrequently, such as people (owner's gender, age, driving experience), car (model, length, width, height and maximum acceleration), road (road type, number of lanes, dangerous information code of roadside equipment 3 and its corresponding meaning. Dynamic tables are used to store dynamic data that changes with time during the data acquisition process, such as: people (eye gaze direction, blink frequency, etc.), car (ID, time, speed, acceleration, etc.) GPS positioning information, event description information, etc.), environment (temperature, pavement adhesion coefficient, etc.).

The matching algorithm used by traffic service cloud computing platform is as follows:

1. Matching of service demand state algorithms. Data stream comparison algorithms for high-speed networking are used. The input of this algorithm is the data collection (A={$x_1,x_2$, to $x_i$}) which is collected by the sensor in real time and extracted by the feature. B={$y_1,y_2$, to $y_j$} is the traffic information state data. The algorithm gives a similar radius r and sliding window value k:

$$d(x_I, y_J) = \min \sum \frac{(\omega_{ij} \|\varphi(x_i) - \varphi(y_i)\|^2) \cdot k}{r_{AB}}$$

$d(x_I,y_J)$ is a similar distance measure function, $\|\varphi(x_i) - \varphi(y_i)\|^2$ represents the Haming distance between $x_i$ and $y_i$, $\omega_{ij}$ is the Euclidean distance of data segment $x_i$ and $y_i$, $r_{AB}$ represents the similarity of data set A and data set B. When $d(x_I,y_J) > r$, then there is traffic demand.

2. Matching algorithm generated by driving service catalog. Traffic information status database and driving services catalog database is a database designed in the form of a classification tree. The algorithm calculates the similarity between the concepts represented by the nodes ($c_p$, $c_q$) according to the semantic distances dis(p,q) between the nodes (p,q) in the classification tree. That is:

$$sim(C_p, C_q) = \begin{cases} 1 & dis(p,q) = 0 \\ 1 - \frac{|dis(p,q)|}{2} & dis(p,q) \neq 0 \\ 0 & dis(p,q) = \infty \end{cases}$$

Figure 2:
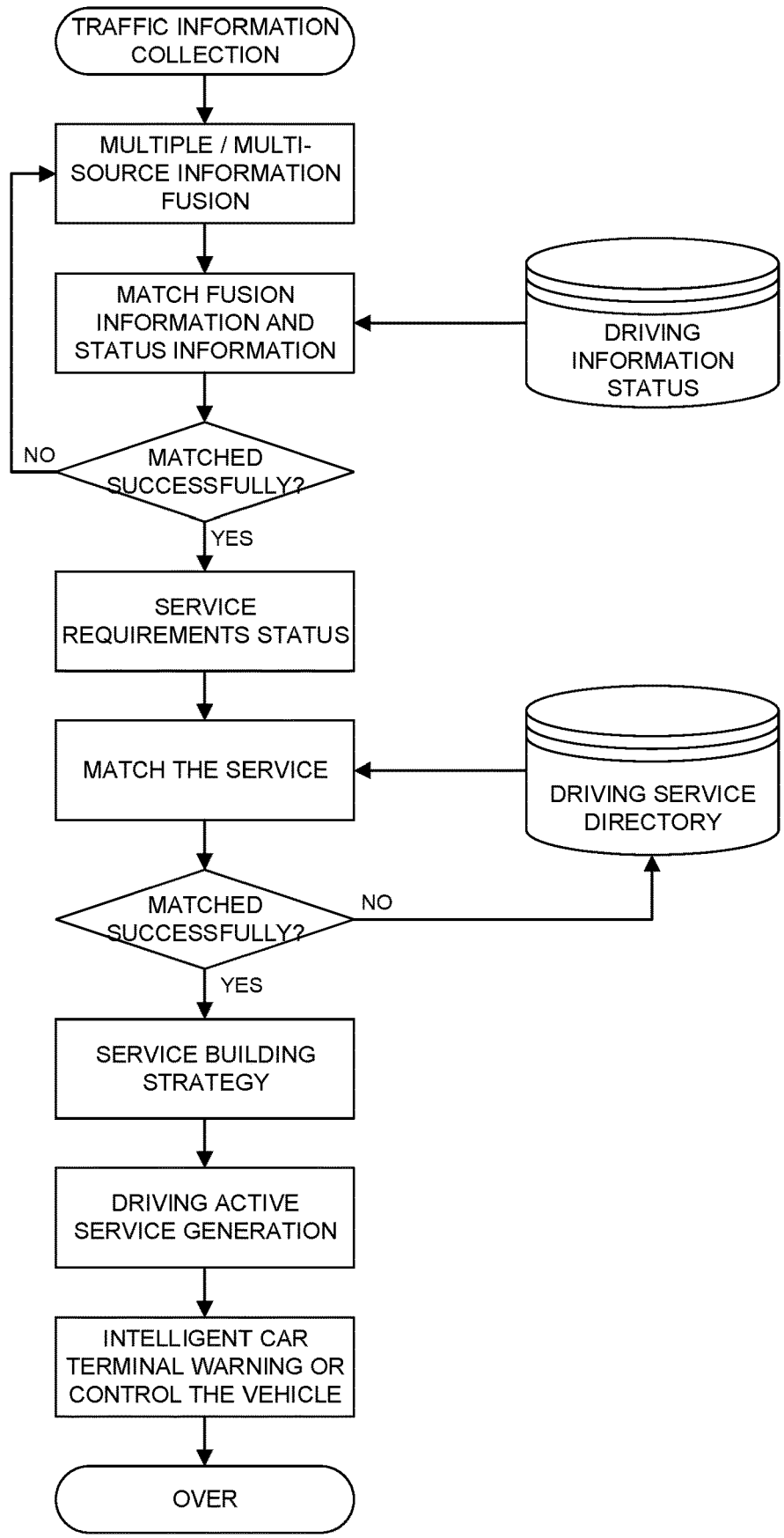
FIG. 2 shows the overall flow chart of the driving service initiative sensing method in the car networking environment.

When the nodes p,q in the classification tree are the same nodes in the tree, dis(p,q)=0, when p,q have paths to arrive, dis(p,q)≠0, when p,q are between When no path arrives in the classification tree, dis(p,q)=∞. When the similarity sim ($c_p$, $c_q$) calculation result is 1, it indicates that the generated service directory is an exact match, and the generated traffic service directory is the same as the required service directory or a subcategory of the required service directory. When the degree of similarity is (0.5, 1), it means that the generated service directory is an alternative match. The traffic service directory formed at this time contains the required service, but not its immediate parent class. When the similarity is (0, 0.5), it means that the generated service directory contains a match. The traffic service directory at this time is a subset of the required service directory. When the similarity is 0, it indicates that the service directory fails to match. FIG. 2 shows the overall flow chart of the active perception system of the down-car service in the car network environment to achieve its function. The active sensing process of the driving service is as follows: Step 1: Traffic information collection: sensor equipment 1 collects vehicle-vehicle operation information in real time, including vehicle speed $v_1$, acceleration $a_1$, steering wheel angle co, engine speed n, vehicle ahead driving information, and road ahead information (road image and video information), and pass the information to smart car terminals. The preceding vehicle driving information includes the vehicle ID of the preceding vehicle, the speed $v_2$ of the vehicle traveling, the acceleration $a_2$, the distance between the own vehicle and the preceding vehicle.

Step 2: Multi-element/multi-source information fusion: The video processing module in the intelligent vehicle-mounted terminal 2 performs feature extraction of video and image information and processes it into recognizable vehicle and lane line information.

The Bluetooth module of the intelligent vehicle-mounted terminal 2 transmits the information collected by the OBD module to the electronic control unit, and the electronic control unit resolves the coordinate information acquired by the GPS differential module to the (x, y, z) coordinates of the spatial rectangular coordinate system xyz.

The Bluetooth module of the intelligent vehicle-mounted terminal 2 transmits the information collected by the OBD module to the electronic control unit. Then, the electronic control unit resolves the coordinate information acquired by the GPS differential module to the (x, y, z) coordinates of the spatial rectangular coordinate system xyz. The information collected by other sensors is transmitted to the electronic control unit through the serial port. The information collected by all sensors is filtered by the Kalman filtering method which is mature and suitable for real-time processing and calculation of the computer, and the white noise is removed from the signals collected by the sensor. Finally, multi-source information fusion for information. The input of multi-source information fusion is the image data (digital information) after feature extraction, the xyz coordinates after GPS coordinates are solved, and the information that can be directly processed by the electronic control unit sent from the sensor. Such as ($v_1$, $a_1$, n, φ, N, $v_2$, $a_2$, vrel, s, ID, θ). The output of multi-source information fusion is a data set that is standardized and facilitates detection of abnormal events, such as {(x, y, z), (x, y, z, $v_n$), ($v_1$, $a_1$, s, $v_2$, $a_2$, vrel) . . . } $v_n$ is the current speed of the vehicle with ID n. The intelligent vehicle-mounted terminal 2 sends the fused information to the roadside equipment 3 through the DSRC. The roadside equipment 3 monitors the driving safety of the vehicle in the monitored area according to the information of the vehicles in the collected area. When it detects that the vehicle is moving abnormally, it generates a driving strategy for the area and pushes it to the vehicle in the area, and sends warning messages to the driver through the intelligent vehicle-mounted terminal 2. When the roadside equipment 3 detects a tendency of the vehicle to travel abnormally (for example, the driver arbitrarily changes the road but does not affect the surrounding vehicles, and the xyz coordinates are compared with the road coordinates to determine that there is a frequent lateral displacement), a hazard information code is generated through communication. The driving service information processing center 4 receives the dangerous information code through the 4G/optical fiber communication of the communication module 2, and analyzes, calculates and processes it. At the same time, the intelligent vehicle-mounted terminal 2 sends the collected information directly to the driving service information processing center 4 through 4G communication.

Step 3: Match the fusion information with the status information: The driving service information processing center 4 prioritizes the dangerous information code sent by the roadside equipment 3, calls the static to obtain the specific content of the dangerous information, and if necessary, sends it to vehicles outside the roadside equipment 3 broadcasting range. The driving service information processing center 4 matches the stored traffic information state library (dynamic table) with the received fusion information, and uses a service demand state matching algorithm to determine whether the vehicle is currently in a service demand state. If the matching is unsuccessful, namely $(d(x_f, y_j) \leq r)$, the system considers that there is no need for driving services, then go to step one; if the matching is successful $(d(x_f, y_j) \leq r)$, the system considers that the vehicle has the need for driving services, then continue to the next step.

Step 4: The traffic service catalog in the driving service information processing center 4 is matched with the fusion information of the service demand state, and the matching algorithm is generated using the service catalog:

1. If the match is successful, that is, $0.5 < \text{sim}(\ ) \leq 1$, the driving service automatically senses success and generates a service catalog, which indicates that the function of the system is completed.

2. If the matching fails, that is, $\text{sim}(\ ) \leq 0.5$, the automatic sensing of the driving service fails. Under the condition of determining the service requirements of the service, when the matching of the service catalog fails, a new service is formed through the component technology to reorganize the service, and the matching algorithm is used to generate the matching service algorithm. When the similarity is $\text{sim}(\ ) > 0.5$, add new services in the service catalog. If $\text{sim}(\ )$ is less than 0.5, re-assemble and match the driving service until the required service is assembled. (The component technology is to subdivide the driving service into the most basic service action program. Through the interface, it can be reorganized and generated. When the existing driving service cannot be matched, these basic service actions are reassembled to provide a new service). After the specific driving service is further generated, the driving service is pushed to the demand vehicle, the static table is called, and the driving service with the highest matching degree is pushed to the intelligent vehicle-mounted terminal 2 of the vehicle for warning according to the vehicle ID. When the situation is critical, the intelligent vehicle-mounted terminal 2 can directly control the vehicle's braking and steering through the vehicle control module, prevent traffic accidents in a timely and active manner, and improve road traffic efficiency.

The invention claimed is:

1. An active sensing method of using a driving service active sensing system in the Internet of Vehicles environment, the driving service active sensing system comprising a sensor device and an intelligent vehicle-mounted terminal mounted in a host vehicle:

the intelligent vehicle-mounted terminal communicating with roadside equipment in 4G and DSRC modes, and communicating with a driving service information processing center in 4G mode;

the sensor device including a camera, an OBD module, a radar sensor, a GPS differential module, a steering wheel angle sensor and a gear position information sensor;

the intelligent vehicle-mounted terminal containing an electronic control unit, a video processing module, a Bluetooth module and a vehicle control module;

the roadside equipment being provided on both sides of a road and including a storage module and an ECU;

the driving service information processing center including a service cloud computing platform, a traffic information state library and a driving service catalog;

the sensor device acquiring and outputting vehicle driving information of the host vehicle to the intelligent vehicle-mounted terminal which processes the vehicle driving information, carries out information fusion on the vehicle driving information to yield fusion information, and then transmits the fusion information to the roadside equipment and the driving service information processing center;

the service cloud computing platform processing the fusion information and outputting driving service information to the roadside equipment and the intelligent vehicle-mounted terminal;

wherein the method comprises the following steps:

Step A: the sensor device transmits the vehicle driving information to the electronic control unit, and the electronic control unit fuses the vehicle driving information to yield the fusion information;

Step B: the roadside equipment monitors the host vehicle on a road section, and when detecting that the host vehicle is abnormally traveling on the road section, issues warning information and generates a danger information code transmitted to the driving service information processing center;

Step C: the traffic information processing center preferentially processes the danger information code, and the traffic information state library matches the fusion information, and determines whether the host vehicle is currently in a driving service demand state by using a service demand state matching algorithm;

if yes, a service catalog database is matched with the fusion information with a demand status of the host vehicle, generates the driving service catalog by using a driving service catalog generation matching algorithm, and pushes the driving service catalog to the host vehicle with a demand;

wherein, in step B, the method for the roadside equipment to monitor the abnormal traveling of the host vehicle is:

the host vehicle in this section of current normal driving coordinates for the positive changes, on the contrary, retrograde coordinates of the reverse change;

if on the road section the vehicle speed of the host vehicle is $v_n > v_x$ for a duration $t > 4s$, the host vehicle is speeding;

when the host vehicle is retrograde or over-speeding, the ECU sends an alarm message to the host vehicle on the road section and transmits the danger information code to the driving service information processing center:

wherein $v_n$ is the vehicle speed of the host vehicle n, and $v_x$ is a speed limit set for the road section.

2. The active sensing method of claim 1, wherein, the camera obtains video and image information of a preceding vehicle located in front of and preceding the host vehicle and processes the video and image information through the video processing module and transmits the video and image information to the electronic control unit;

the OBD module obtains vehicle speed, acceleration, engine speed, exhaust system operating parameters and vehicle fault code information of the host vehicle, and transmits the message to the electronic control unit via the Bluetooth module;

the radar sensor detects and inputs speed and acceleration of the preceding vehicle, a relative speed of the host vehicle and the preceding vehicle, distance between the host vehicle and the preceding vehicle, and azimuth angle information of the preceding vehicle relative to the host vehicle into the electronic control unit;

the GPS differential module obtains GPS coordinate information of longitude, latitude and altitude of the host vehicle and inputs the GPS coordinate information into the electronic control unit;

the steering wheel angle sensor obtains steering wheel angle information and inputs the steering wheel angle information to the electronic control unit, the gear stage information sensor obtains current gear stage information of the host vehicle and inputs the current gear stage information to the electronic control unit.

3. The active sensing method of claim 2, wherein, the electronic control unit solves GPS coordinate information into xyz coordinates in a space rectangular coordinate system and sends the GPS coordinate information and xyz coordinate information to the roadside equipment, the roadside equipment also receives vehicle speed of each vehicle on the road from the intelligent vehicle mounted terminal.

4. The active sensing method of claim 3, wherein a driving information status database stores the vehicle driving information, the traffic information state library and a driving service catalog link through an external code.

5. The active sensing method of claim 1, wherein, in step C, after the driving service catalog is pushed to the host vehicle, the intelligent vehicle-mounted terminal can directly control the car to brake and steer through the vehicle control module.

6. The active sensing method of claim 1, wherein, in step C, the service demand state matching algorithm is:

using sensor acquisition and feature extraction to obtain a data set $A=\{x_1, x_2, \ldots, x_i\}$, calculating similarity of the data set A and driving information status data set $B=\{y_1, y_2, \ldots, y_i\}$;

given a similar radius r and sliding window value k:

$$d(x_I, y_J) = \min \sum \frac{(\omega_{ij}\|\varphi(x_i) - \varphi(y_i)\|^2) \cdot k}{r_{AB}}$$

$d(x_i, y_j)$ is a similar distance measure function, $\|\varphi(x_i)-\varphi(y_i)\|^2$ represents the haming distance between $x_i$ and $y_i$, $\omega_{ij}$ is the Euclidean distance of data segment $x_i$ and $y_1$, $r_{AB}$ represents the similarity of the data set A and the driving information status data B;

when $d(x_i, y_j)>r$, then it is determined that there is a driving service demand.

7. The active sensing method of claim 1, wherein, in step C, the driving service catalog generation matching algorithm is the traffic information state library and the driving service catalog is a database designed in the form of a classification tree;

according to a semantic distance dis(p, q) between the nodes (p, q) in the classification tree, a similarity sim $(C_p, C_q)$ between concepts $(C_p, C_q)$ represented by nodes is calculated;

when the similarity sim $(C_p, C_q)$ is 1, the driving service catalog is an exact match;

when the similarity is (0.5,1), the driving service catalog is an alternative match;

when the similarity is (0, 0.5), the driving service catalog is an inclusion match and if the similarity is 0, it indicates that the match of the driving service catalog is failed.

8. An active sensing method of using a driving service active sensing system in the Internet of Vehicles environment, the driving service active sensing system comprising a sensor device and an intelligent vehicle-mounted terminal mounted in a host vehicle:

the intelligent vehicle-mounted terminal communicating with roadside equipment in 4G and DSRC modes, and communicating with a driving service information processing center in 4G mode;

the sensor device including a camera, an OBD module, a radar sensor, a GPS differential module, a steering wheel angle sensor and a gear position information sensor;

the intelligent vehicle-mounted terminal containing an electronic control unit, a video processing module, a Bluetooth module and a vehicle control module;

the roadside equipment being provided on both sides of a road and including a storage module and an ECU;

the driving service information processing center including a service cloud computing platform, a traffic information state library and a driving service catalog;

the sensor device acquiring and outputting vehicle driving information of the host vehicle to the intelligent vehicle-mounted terminal which processes the vehicle driving information, carries out information fusion on the vehicle driving information to yield fusion information, and then transmits the fusion information to the roadside equipment and the driving service information processing center;

the service cloud computing platform processing the fusion information and outputting driving service information to the roadside equipment and the intelligent vehicle-mounted terminal;

wherein the method comprises the following steps:

Step A: the sensor device transmits the vehicle driving information to the electronic control unit, and the electronic control unit fuses the vehicle driving information to yield the fusion information;

Step B: the roadside equipment monitors the host vehicle on a road section, and when detecting that the host vehicle is abnormally traveling on the road section, issues warning information and generates a danger information code transmitted to the driving service information processing center;

Step C: the traffic information processing center preferentially processes the danger information code, and the traffic information state library matches the fusion information, and determines whether the host vehicle is currently in a driving service demand state by using a service demand state matching algorithm;

if yes, a service catalog database is matched with the fusion information with a demand status of the host vehicle, generates the driving service catalog by using a driving service catalog generation matching algorithm, and pushes the driving service catalog to the host vehicle with a demand;

wherein, in step C, the service demand state matching algorithm is:

using sensor acquisition and feature extraction to obtain a data set $A=\{x_1, x_2, \ldots, x_i\}$, calculating similarity of the data set A and driving information status data set $B=\{y_1, y_2, \ldots, y_i\}$;

given a similar radius r and sliding window value k:

$$d(x_I, y_J) = \min \sum \frac{(\omega_{ij}\|\varphi(x_i) - \varphi(y_i)\|^2) \cdot k}{r_{AB}}$$

$d(x_i, y_j)$ is a similar distance measure function, $\|\varphi(x_i)-\varphi(y_i)\|^2$ represents the haming distance between $x_i$ and $y_i$, $\omega_{ij}$ is the Euclidean distance of data segment $x_i$ and $y_j$, $r_{AB}$ represents the similarity of the data set A and the driving information status data B;

when $d(x_i,y_j)>r$, then it is determined that there is a driving service demand.

9. The active sensing method of claim 8, wherein, the camera obtains video and image information of a preceding vehicle located in front of and preceding the host vehicle and processes the video and image information through the video processing module and transmits the video and image information to the electronic control unit;

the OBD module obtains vehicle speed, acceleration, engine speed, exhaust system operating parameters and vehicle fault code information of the host vehicle, and transmits the message to the electronic control unit via the Bluetooth module;

the radar sensor detects and inputs speed and acceleration of the preceding vehicle, a relative speed of the host vehicle and the preceding vehicle, distance between the host vehicle and the preceding vehicle, and azimuth angle information of the preceding vehicle relative to the host vehicle into the electronic control unit;

the GPS differential module obtains GPS coordinate information of longitude, latitude and altitude of the host vehicle and inputs the GPS coordinate information into the electronic control unit;

the steering wheel angle sensor obtains steering wheel angle information and inputs the steering wheel angle information to the electronic control unit, the gear stage information sensor obtains current gear stage information of the host vehicle and inputs the current gear stage information to the electronic control unit.

10. The active sensing method of claim 9, wherein, the electronic control unit solves GPS coordinate information into xyz coordinates in a space rectangular coordinate system and sends the GPS coordinate information and xyz coordinate information to the roadside equipment, the roadside equipment also receives vehicle speed of each vehicle on the road from the intelligent vehicle mounted terminal.

11. The active sensing method of claim 10, wherein a driving information status database stores the vehicle driving information, the traffic information state library and a driving service catalog link through an external code.

* * * * *